(12) United States Patent
Mentele et al.

(10) Patent No.: US 6,461,096 B1
(45) Date of Patent: Oct. 8, 2002

(54) TILT BED FOR LOADING AND TRANSPORTING A LOAD

(75) Inventors: Carl R. Mentele; Bernard VanWassenhove, both of Mitchell, SD (US)

(73) Assignee: Trail King Industries, Inc., Mitchell, SD (US)

( * ) Notice: Subject to any disclaimer, the term of this patent is extended or adjusted under 35 U.S.C. 154(b) by 0 days.

(21) Appl. No.: 08/647,879

(22) Filed: May 13, 1996

Related U.S. Application Data

(63) Continuation of application No. 08/108,041, filed on Aug. 16, 1993.

(51) Int. Cl.$^7$ .............................. B60D 1/04; B62B 1/00
(52) U.S. Cl. ..................... 414/480; 414/477; 414/482; 280/656
(58) Field of Search ................. 414/349, 350, 414/430, 467, 469, 476, 477, 479, 480, 482–485, 533, 534; 298/12, 14, 17.5; 280/656

(56) References Cited

U.S. PATENT DOCUMENTS

| | | | | |
|---|---|---|---|---|
| 412,223 A | * | 10/1889 | Lyksett ..................... | 298/14 |
| 654,333 A | * | 7/1900 | Vasquez ..................... | 298/14 |
| 1,077,570 A | * | 11/1913 | Vincent ..................... | 298/14 |
| 1,268,598 A | * | 6/1918 | Moore ..................... | 298/14 |
| 1,712,398 A | * | 5/1929 | Palmero et al. .............. | 298/12 |
| 3,032,217 A | * | 5/1962 | Musson et al. .............. | 414/486 |
| 3,066,816 A | * | 12/1962 | Schwartz ..................... | 414/480 |
| 3,450,282 A | * | 6/1969 | Ezolt ........................ | 298/14 |
| 3,833,263 A | * | 9/1974 | Jackson ...................... | 298/17.5 |
| 4,127,202 A | * | 11/1978 | Jennings et al. ............. | 414/537 |
| 4,249,851 A | * | 2/1981 | Sedelmayer ................. | 414/480 |
| 4,318,657 A | * | 3/1982 | Znidaric ..................... | 298/14 |
| 4,470,746 A | * | 9/1984 | Delachapelle ................ | 414/470 |
| 4,516,902 A | * | 5/1985 | Matson ....................... | 414/480 |
| 4,702,662 A | * | 10/1987 | Marlett ....................... | 414/477 |
| 4,730,974 A | * | 3/1988 | Andre ......................... | 414/483 |
| 4,789,281 A | * | 12/1988 | Westerdale .................. | 180/286 |
| 4,842,470 A | * | 6/1989 | Hubbard ...................... | 414/478 |
| 4,929,142 A | * | 5/1990 | Nespor ........................ | 414/563 |
| 5,011,362 A | * | 4/1991 | Pijanowski ................... | 414/480 |
| 5,203,667 A | * | 4/1993 | Yoneda et al. ............... | 414/477 |
| 5,249,909 A | * | 10/1993 | Roberts et al. .............. | 414/476 |

FOREIGN PATENT DOCUMENTS

| | | | | |
|---|---|---|---|---|
| DE | 3244244 | * | 7/1903 | .................. 414/480 |
| DE | 961687 | * | 4/1957 | .................. 298/14 |
| EP | 336313 | * | 10/1989 | .................. 414/477 |
| FR | 2686843 | * | 8/1993 | .................. 414/486 |
| JP | 58-63531 | * | 4/1983 | .................. 298/12 |
| JP | 220033 | * | 9/1991 | .................. 414/480 |

OTHER PUBLICATIONS

Transportation Equipment Development Corp; Mark I Piggyback Transporter, 1961; Class 212; Sub. 480.*
Vulcan 818; Vulcan Equipment Co. Inc. P.O. Box 826 8530 Sandidge Rd. Olive Branch, MS; Apr. 1990; 414/477.*
Holmes 2205 Carrier; Holmes International Inc., 2505 East 43rd St. Chattanooga, Tn.; Apr. 1990; 414/477.*

* cited by examiner

*Primary Examiner*—Eileen D. Lillis
*Assistant Examiner*—R. B. Johnson
(74) *Attorney, Agent, or Firm*—Merchant & Gould P.C.

(57) ABSTRACT

A tilt bed for a truck or a trailer, the tilt bed being able of carrying loads and providing its own ramp. The tilt bed comprises a frame, and a deck mounted on and supported by the frame, the deck having a front portion and a rear portion. The deck has rollers connected to the front portion, and the frame has tracks mounted at an angle, the tracks for guiding the deck rollers. The trailer bed further comprises a hydraulic cylinder that has a first end connected to the frame and a second end connected to the trailer bed. The hydraulic cylinder has a piston and a cylinder. As the piston moves from an extended state into a retracted state, it causes the trailer bed to move in a rearward position. At the same time, the tracks force the deck rollers in an upward motion and cause the trailer bed to tilt. Finally, the hydraulic cylinder remains parallel to the trailer deck at all times. This orientation is accomplished because the trailer deck and the hydraulic cylinder tilt around a common axis.

2 Claims, 5 Drawing Sheets

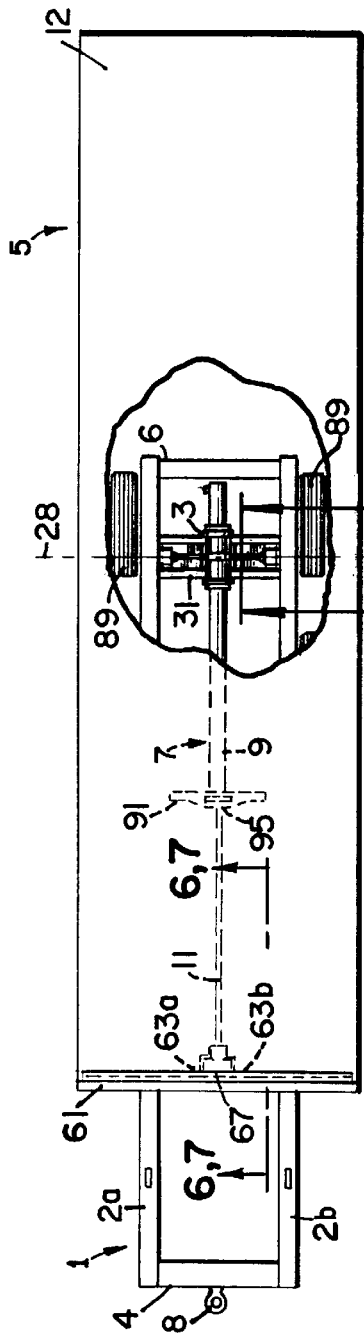
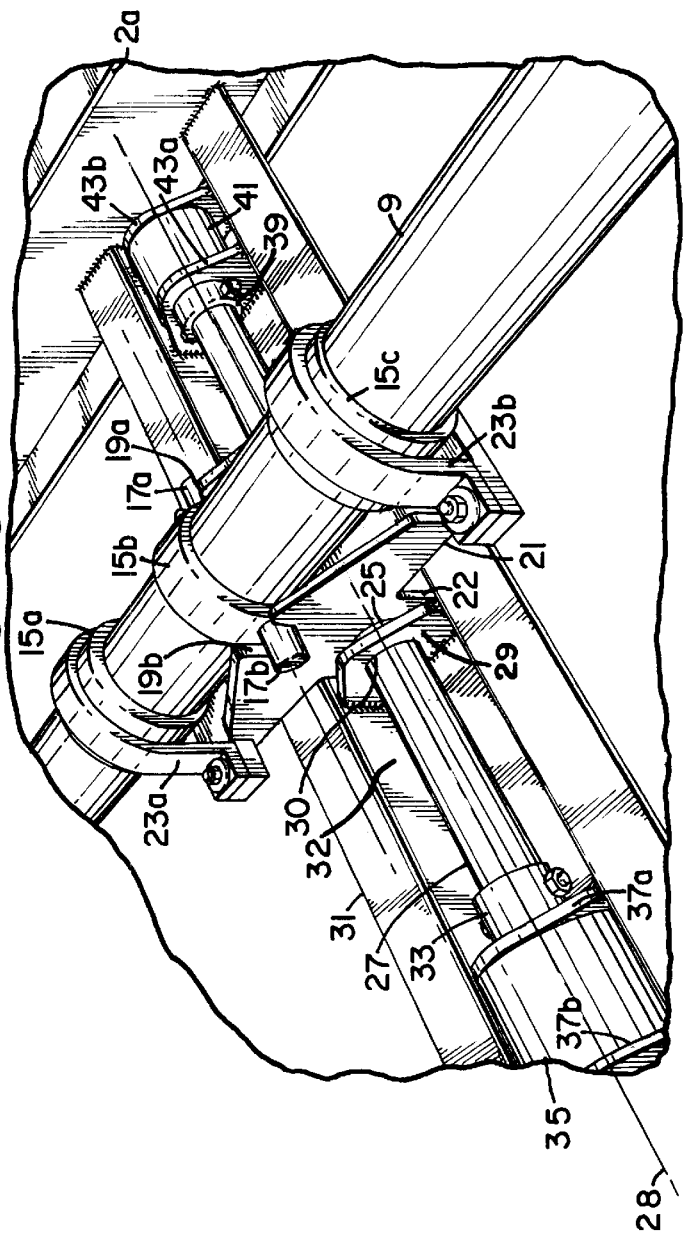

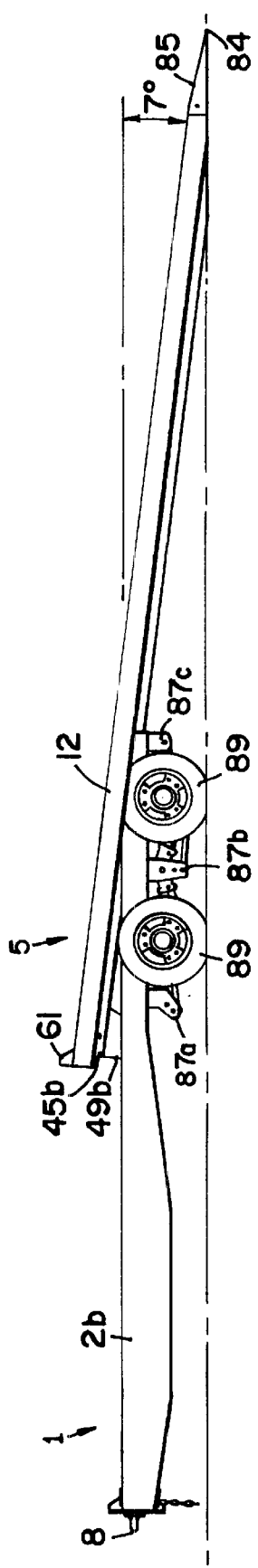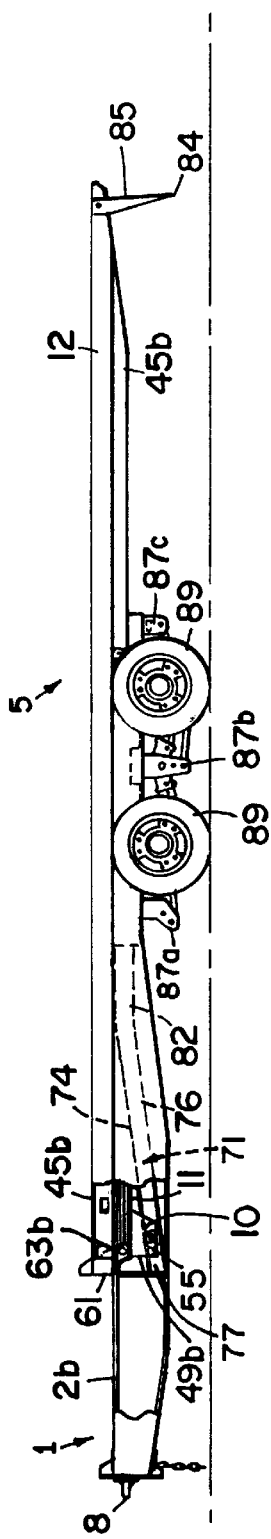

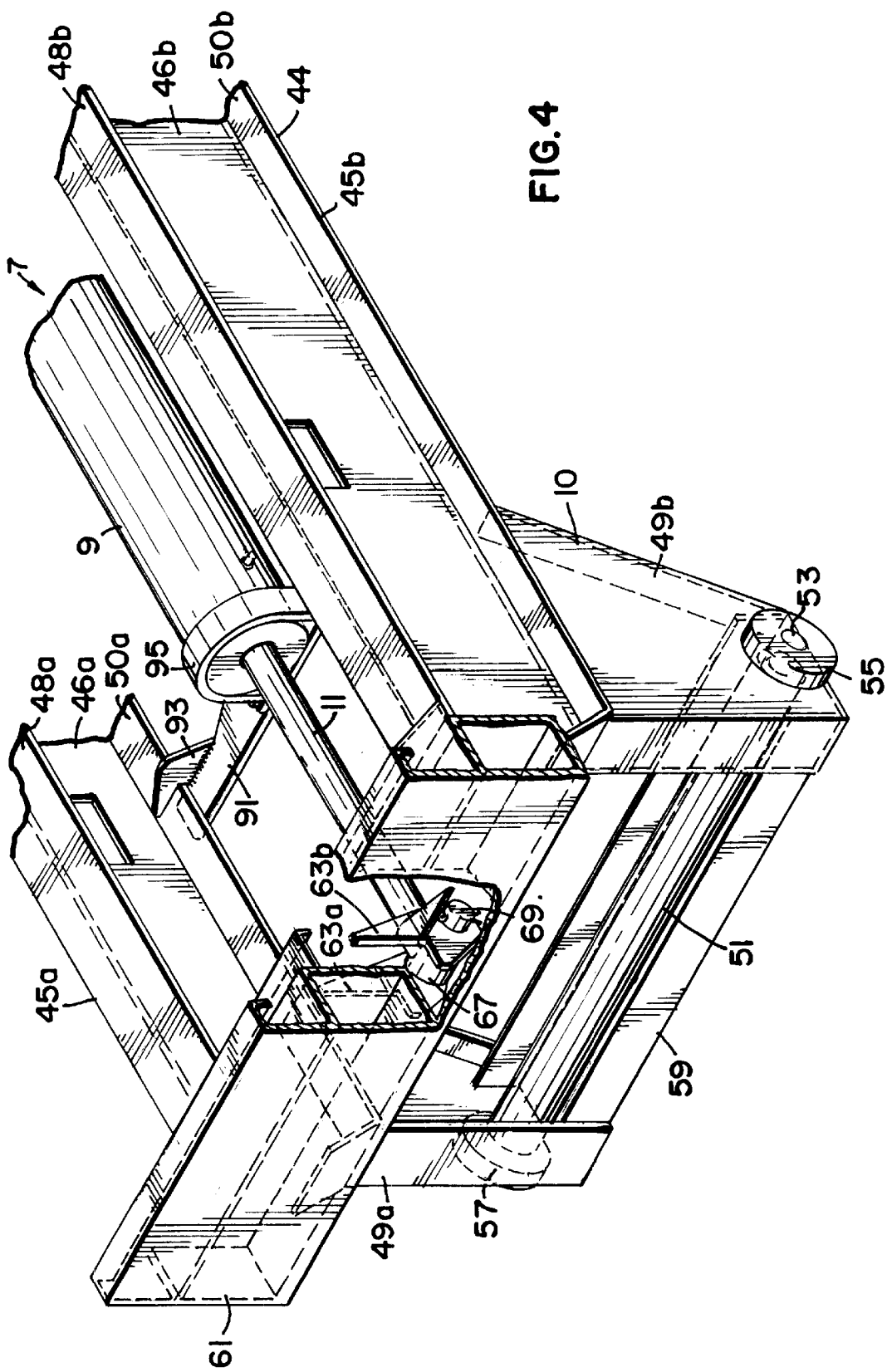

TILT BED FOR LOADING AND TRANSPORTING A LOAD

This is a Continuation of application Ser. No. 08/108,041, filed Aug. 16, 1993.

TECHNICAL FIELD

The present invention relates to trailers for carrying vehicles and movable equipment with a low ground clearance, and more particularly to a trailer in which the trailer bed will simultaneously rollback and tilt into a loading position so that a cargo vehicle or movable equipment with low ground clearance may be driven, pushed, or pulled onto the trailer bed.

BACKGROUND

Apparatuses for towing or transporting vehicles have been around for a long time. One of the more recent devices for transporting automobiles is tilt-bed trucks in which the bed of the truck tilts so that the back edge of the trailer bed is adjacent to the ground. A winch is then used to pull the automobile up onto the trailer bed. After the automobile is loaded on the trailer bed, it is tilted back to a horizontal position for transporting the vehicle to another location. The problem with this current type of tilt-bed trailer is that the load angle is typically about 45°. Because of this high load angle, only vehicles with a large road clearance may be loaded for transportation. Therefore, the current form of tilt bed trucks and trailers does not allow the loading and unloading of cargo vehicles and movable equipment that has a low ground clearance Examples of movable equipment with low ground clearance includes paving equipment, which has a maximum load angle of about 7°.

Current apparatuses and methods for loading cargo vehicles and movable equipment with a low clearance include the use of ramps. Oftentimes a low flat trailer will include removable or hydraulic ramps for loading or unloading cargo vehicles or movable equipment. The ramps are either (1) carried with the trailer and are attached to the rear portion of the trailer bed for loading and unloading, or (2) are hydraulically attached to the rear portion of the trailer and are raised or lowered for loading and unloading. The cargo vehicle may then be driven, pushed or pulled onto or off of the trailer bed.

The problem with the use of ramps is that the junction between the ramp and the trailer bed forms an angled corner, and the tires of the cargo vehicle rest on a geometric plane. After the front tires move onto the trailer bed, the angled corner will protrude beyond the geometric plane to a point that approached the bottom of the cargo vehicle. If the ramp is too steep, the angled corner will protrude beyond the geometric plane and strike the bottom of the cargo vehicle. Therefore, cargo vehicles that have a very low ground clearance require extra long ramps in order to minimize the angled corner.

Different problems are caused if the cargo vehicle has continuous tracks such as the tracks of a bulldozer. The cargo vehicle will continue to move at the same angle of the ramp even as it moves beyond the ramp. The cargo vehicle will then drop down onto the trailer bed after more than 50% of its weight moves beyond the angled corner. The impact caused by the drop may cause damage to the trailer or the cargo vehicle. Again, extra long ramps must be used in order to minimize this problem.

The use of extra long hydraulic ramps is impractical. If the ramp forms a portion of the trailer bed, it cannot extend forward of the trailer wheels and suspension. As a result, extra long ramps would have to extend behind the tires a great distance resulting in design problems that would make the trailer unsafe and difficult to pull. If the hydraulic ramp was hinged to the rear end of the trailer, the ramp would extend into the air a great distance when it is moved up into a vertical position for transport. This projection into the air would cause alternative problems including a potential increase in the clearance height of the truck/trailer and a loss of gas mileage because of poor aerodynamics.

An additional problem with detachable ramps is that they may be forgotten or lost during transport. If this happens, the cargo vehicle or movable equipment may not be loaded onto or unloaded from the trailer bed.

An alternative method to solving the problem of loading cargo vehicles and movable equipment is the use of trailers that have a bed that is permanently oriented at an angle. In this situation the ramps are used to extend the length of trailer bed so that it reaches the ground. Cargo vehicles may then be loaded or unloaded. The problem with this design is the cargo vehicle secure a constant force on the straps and chains that exert it to the trailer bed and there is a much greater chance that the cargo vehicle will break loose during transport and roll off the back of the trailer. Additionally, the detachable extension ramps may be forgotten or lost.

Yet another solution to the problem is detachable goose neck trailers. These are semi-truck trailers in which the front end of the trailer is attached to a goose neck. The opposite side of the goose neck is attached to the king pin. In operation, a hydraulic system will lower the front end of the trailer bed until it reaches the ground, and the goose neck is then detached. A cargo vehicle or movable equipment may then be loaded onto the trailer bed. The goose neck is then reattached and the front end of the trailer bed is raised for transport. The difficulty with this system is that it is cumbersome to use and is only practical for a semi-truck trailer. Thus, the trailer is more expensive and requires the purchase of an expensive semi-truck.

Therefore, there remains need for a trailer that may be towed by different types of trucks and is able to provide a minimal loading angle in order to permit the loading and unloading of load vehicles and movable equipment having a very low clearance.

SUMMARY

Furthermore, the present invention eliminates the need for any type of a loading ramp, permanently angled trailer bed, or detachable goose neck.

The present invention consists of a frame and a deck that is mounted on and supported by the frame. The invention further has a hydraulic cylinder for selectively moving the deck between a substantially horizontal load-carrying position and an inclined loading position. When the deck is in the inclined loading position, the rear portion of the deck is proximate to the ground so that a cargo vehicle or movable equipment may be driven, pushed, or pulled onto the deck. Furthermore, the angle of the deck is less than 10°.

A more specific description of a preferred embodiment of the invention is a tilt-bed trailer that has a frame and a deck mounted on and supported by the frame. The deck is movable and tiltable between a horizontal load-carrying position and an inclined loading position. The invention further has an angled track connected to the frame for guiding rollers that are attached to a front portion of the deck. A hydraulic cylinder is connected between the deck and the frame. When the hydraulic cylinder moves into a retracted configuration, the deck is caused to move rearward, and the tracks force the front end of the deck to move in an upward direction, thereby tilting the deck. When the deck is moved to its full rearward position, i.e. when the rollers of the deck are moved to the rear ends of the tracks, the rear portion of the deck is proximate to the ground so that cargo with a low ground clearance may be driven, pushed, or pulled onto the deck. The hydraulic cylinder may then be moved into an extended configuration, which causes the deck to move in a forward direction, and the track forces the front of the trailer to move downward, thereby causing the deck to move into a horizontal load carrying position. The hydraulic cylinder is anchored to the frame in such a manner that the hydraulic cylinder remains parallel to the deck at all times, regardless of whether the trailer bed is in the horizontal load-carrying position or the inclined loading position.

These and other advantages of the present invention will become apparent from the more detailed description of the preferred embodiment that follows.

DETAILED DESCRIPTION OF THE DRAWINGS

FIG. 1 is a top elevational view of the trailer with a breakout showing the pivot point roller assembly.

FIG. 2 is a side elevational view of the trailer, shown in FIG. 1, with the trailer bed in the horizontal load carrying position, with a breakout that shows the track roller assembly, and with hidden lines that represent the track.

FIG. 3 is a side elevational view of the trailer, shown in FIG. 1, with the trailer bed in an inclined loading position.

FIG. 4 is a partial perspective view of the subframe; hydraulic cylinder; and track roller assembly, which is shown in the breakout of FIG. 2.

FIG. 5 is a fragmentary view of the pivot point roller assembly, shown in the breakout of FIG. 1.

DETAILED DESCRIPTION

Figure 6:
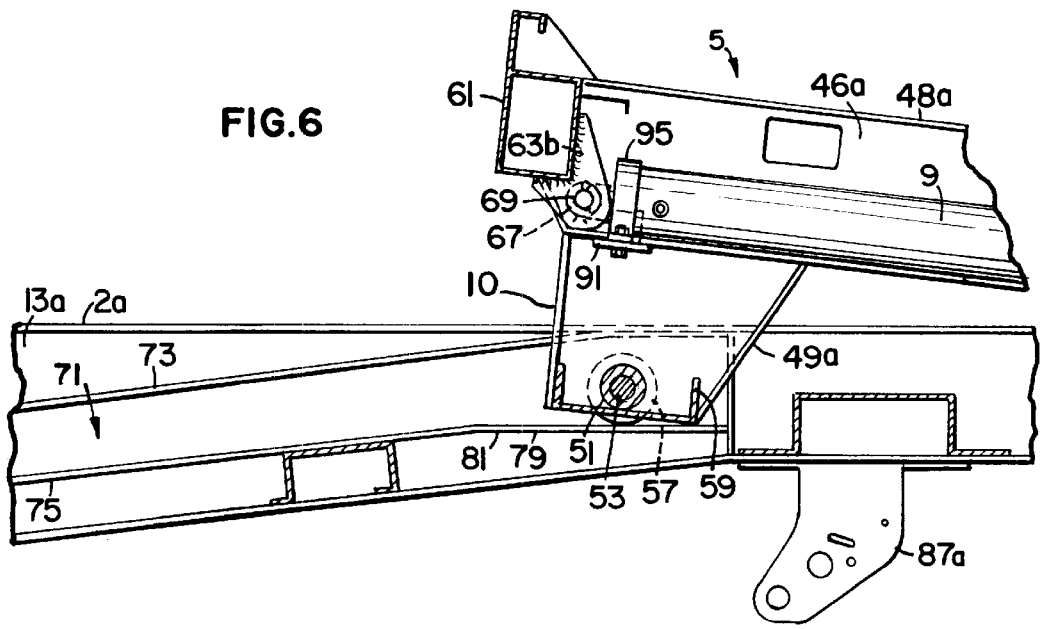
FIG. 6 is a partial sectional view of the trailer shown in FIG. 1 taken along line 6—6 with the trailer bed tilted as if the terrain underneath the trailer was even.
Figure 7:
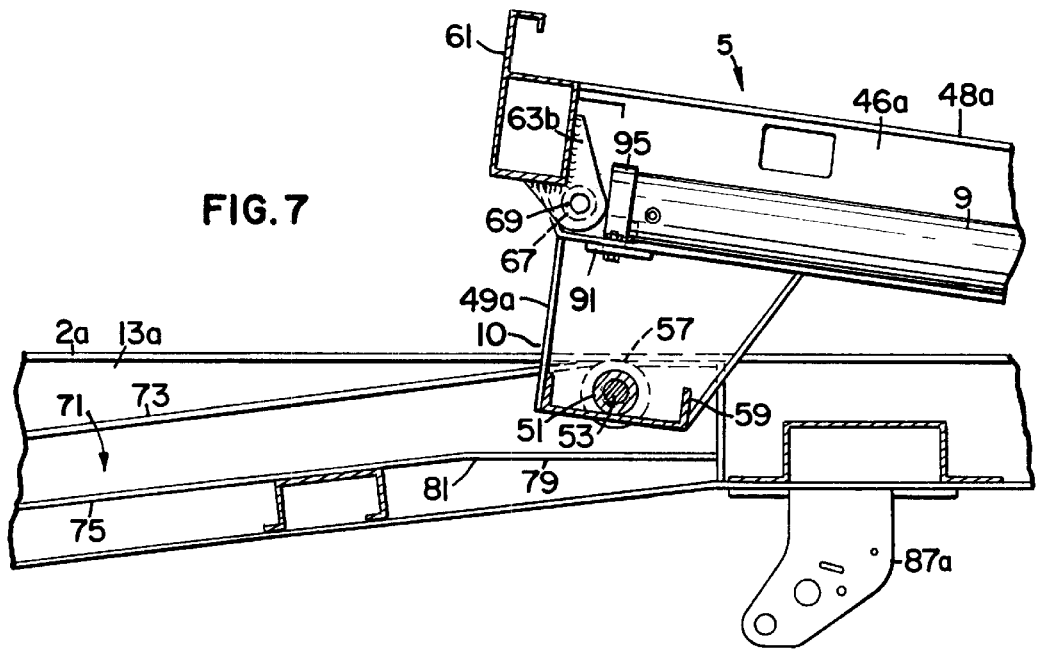
FIG. 7 is a partial sectional view of the trailer shown in FIG. 1 taken along line 7—7 with the trailer bed tilted as if the terrain underneath the trailer was uneven.

Referring now to the figures, there is illustrated preferred embodiments of a tilt bed trailer constructed according to the principles of the present invention. As shown in FIGS. 1, 2, and 3 the tilt bed trailer includes a frame 1, a hydraulic cylinder 7, a pivot-point roller assembly 3, a trailer bed 5, and a track roller assembly 10. As shown in FIGS. 2 and 3, when trailer bed 5 is moved in a rearward direction relative to the frame 1, it tilts around pivot-point roller assembly 3 into an inclined position for loading. The angle of trailer bed 5, from the horizontal, is approximately 7° in the full inclined loading position. Conversely, when trailer bed 5 is moved in a forward direction relative to the frame 1, it tilts around pivot-point roller assembly 3 into a horizontal load-carrying position.

Frame 1 has I beams 2a and 2b which are parallel to one another. Forward beam 4 is attached to the front end of I beams 2a and 2b and rear beam 6 is attached to the rear end of I beams 2a and 2b. As one skilled in the art will appreciate, there are several cross-members that perpendicular to I beams 2a and 2b and extend from I beam 2a to I beam 2b. As one skilled in the art will further appreciate, eyelet 8 is attached to forward beam 4 and is adapted for use in a clevis-type trailer hitch, suspension members 87a, 87b, 87c are connected to I-beams 2a and 2b, and wheels 89 are connected to suspension members 87a, 87b, 87c. The preferred tires are 215/75R17.5, and the preferred suspension is Spring Part No. 365-00 manufactured by Hutch Industries of Springfield, Mo.

As shown in FIG. 4, hydraulic cylinder 7 has a cylinder 9 and a piston 11. Attachment tube 67 is secured by conventional means to the end of piston 11 and, as described below, is adapted for attachment to trailer bed 5. As shown in FIG. 5, cylinder 9 has raised portions 15a, 15b, and 15c, and pins 17a and 17b, which extend from either side of raised portion 15a. As one skilled in the art will appreciate, a hydraulic system is attached to the hydraulic cylinder 7 in order to cause the piston 11 to retract into and extend from cylinder 9.

Pivot-point roller assembly 3 is shown in FIG. 5. Pivot-point roller assembly 3 includes a cradle 21 that defines two vertically oriented slots 19a and 19b in which pins 17a and 17b are located, respectively. Clamps 23a and 23b wrap around raised portions 15a and 15c, respectively, and are secured to cradle 21 by bolts. Thus, the pins 17a and 17b and clamps 23a and 23b secure cylinder 9 to cradle 21. The bottom portion of cylinder cradle 21 has a flange 22 that defines a bushing hole 25. An identical flange and bushing hole, not shown, are located at the opposite side of the cradle 21. A cradle bushing, not shown, fits in bushing hole 25 and extends to and fits in the identical bushing-hole. The cradle bushing is secured to flange 22 and the identical flange by conventional means. Roller shaft 27 has axis 28 and passes through the cradle bushing. The inside surface of the cradle bushing is lined with grease so that cradle 21 will freely rotate around roller shaft 27 and hence axis 28. The advantage of this design is that hydraulic cylinder 7 will tilt around axis 28.

Figure 8A:
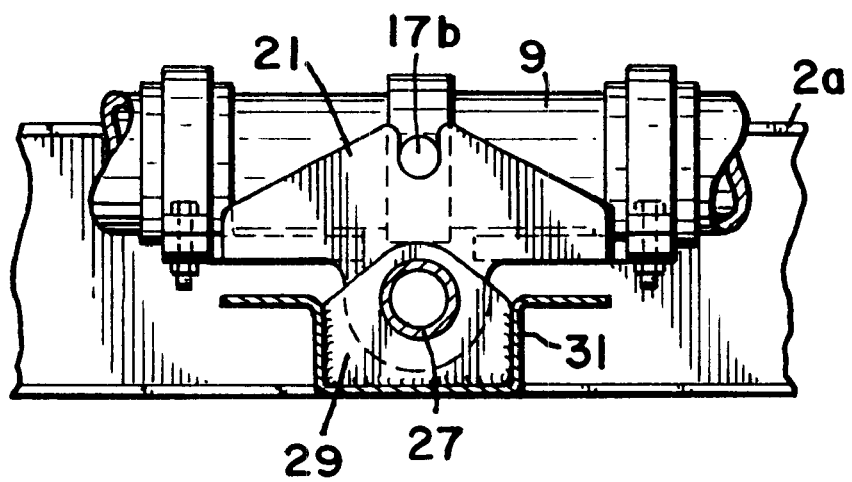
FIG. 8A is a partial side view of the roller assembly corresponding to the trailer configuration depicted in FIG. 2.
Figure 8B:
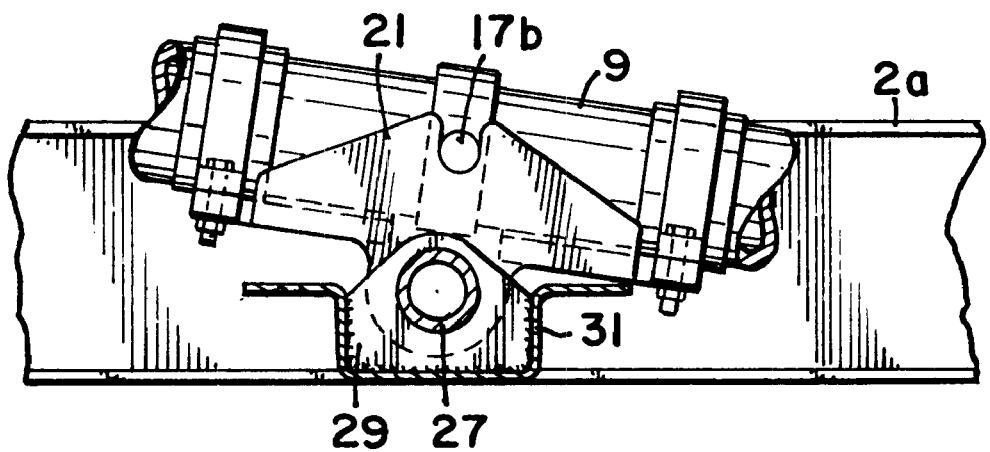
FIG. 8B is a partial side view of the roller assembly corresponding to the trailer configuration depicted in FIG. 3.

Cross-member 31 defines channel 32 and has one end secured to I beam 2a and an opposite end secured to I beam 2b. Bracket 29 is attached to cross-member 31 at a point within channel 32 and has hole 30. An identical bracket, not shown, is located at the opposite side of cradle 21. Thus, flange 22 on cradle 21 is sandwiched between brackets (one of which is designated as 29) and rotates relative thereto, as shown in FIGS. 8A and 8B. Roller shaft 27 extends from I beam 2a to I beam 2b and passes through hole 30 in bracket 29 and through a hole in the identical bracket. Roller bushing 33 circumscribes the end portion of roller shaft 27 and is secured to roller shaft 27 with a bolt. Roller 35 circumscribes roller bushing 33. Bearings, not shown, are located between roller 35 and roller bushing 33 so that roller 35 may rotate freely. Brackets 37a and 37b support roller bushing 33 and are welded to cross-member 31 at a point within channel 32. An identical assembly is located at the opposite end of roller shaft 27 and has roller bushing 39, roller 41, brackets 43a and 43b, and bearings, not shown.

Trailer bed 5 has a subframe 44 that is represented in FIG. 4. Subframe 44 has two parallel subframe I beams 45a and 45b that have webs 46a and 46b, top flanges 48a and 48b, and bottom flanges 50a and 50b, respectively. Front rail 61 is attached to the front of subframe I-beams 45a and 45b. Piston brackets 63a and 63b are attached to front rail 61 and extend downward. The distance between piston brackets 63a and 63b is slightly larger than the length of attachment tube 67. Both piston brackets 63a and 63b have holes that are in axial alignment with attachment tube 67. Pin 69 passes through attachment tube 67 and the holes in piston brackets 63a and 63b. Pin 69 is secured in place by suitable means such as a cotter pins.

Brace 91 extends from a position underneath bottom flange 50a to a position underneath bottom flange 50b. Brace flange 93 is attached to brace 91 and extends over the top of bottom flange 50a, and an identical brace flange, not shown, extends over the top of bottom flange 50b. Clamp 95 is attached to brace 91 and secures brace 91 to cylinder 9. Thus, as trailer bed 5 moves in a forward or rearward direction, relative to frame 1 I beams 45a and 45b slide along brace 91. Bottom flange 50a rests on roller 35, and bottom flange 50b rests on roller 41. Therefore, trailer bed 5 is movable over rollers 35 and 41 in a forward and rearward direction. Additionally, trailer bed 5 is tiltable over rollers 35 and 41 and hence is tiltable around axis 28. As one skilled in the art will appreciate, deck 12 is attached to top flanges 48a and 48b by conventional means, and subframe cross members, not shown, extend from subframe I beam 48a to subframe I beam 48b to support deck 12.

Track roller assembly 10 has brackets 49a and 49b which extend downward from bottom flanges 50a and 50b, respectively, and define holes, not shown. Bushing 51 extends from bracket 49a to bracket 49b and is in axial alignment with the holes. Track roller shaft 53 extends through the holes and bushing 51. Track roller 55 circumscribes the end portion of roller shaft 53. Bearings, not shown, are located between track roller 55 and track roller shaft 53 so that track roller 55 may freely rotate around track roller shaft 53. An identical track roller 57 and bearings, not shown, are mounted at the opposite end of track roller shaft 53. An additional cross-member 59 extends from bracket 49a to bracket 49b in order to provide stability and strength to brackets 49a and 49b and to protect bushing 51 from debris that get kicked up from the road.

As shown in FIG. 6, track 71 extends along a portion of the web 13a of I-beam 2a. Track 71 is formed by a top rail 73 and a bottom rail 75 which are parallel to one another for most of their length and are welded to the inside of web 13a. Furthermore, the distance between the top rail 73 and the bottom rail 75 is slightly larger than the diameter of the track rollers 55 and 57. Track 71 is angled so that the rear end 79 has an elevation that is higher than the front end 77. The bottom rail 75 has a horizontal portion 81 located at the rear end 79. As a result, the distance between the top rail 73 and the bottom rail 75 is consistent except for the portion that extends along horizontal portion 81 at which point the distance between the top rail 73 and the bottom rail 75 increases. As described below, this divergence of the rails accommodates loading the trailer bed 5 when the terrain has an uneven elevation. Roller 57 is located in track 71 between top rail 73 and bottom rail 75. An identical track 72 is located on the inside of web of I-beam 2b and guides the second roller 55.

As one skilled in the art will appreciate, fold down approach ramp 85 is attached to the rear portion of trailer bed 5. As one skilled in the art will further appreciate, fold down approach ramp 85 is attached to a second hydraulic cylinder, not shown, by conventional means. The hydraulic system is also attached to this second hydraulic cylinder. The second hydraulic cylinder is capable of moving fold down approach ramp 85 between a vertical orientation and a horizontal orientation.

As previously discussed, trailer bed 5 has two positions. In the first position, shown in FIG. 2, trailer bed 5 is in a forward horizontal position for transporting loads such as cargo vehicles and movable equipment. In this position, fold down approach ramp 85 is vertical, extending downward from trailer bed 5. In the second position, shown in FIG. 3, fold down approach ramp 85 is inclined so that a cargo vehicle may be driven, pushed, or pulled onto trailer bed 5.

In order to move trailer bed 5 from the horizontal to the inclined position, fold-down approach ramp 85 must be rotated so that it is in the same horizontal plane as trailer bed 5 and extends outward from trailer bed 5 thereby becoming an extension of deck 12. Hydraulic cylinder 7 is then activated causing piston 11 to retract into cylinder 9. As piston 11 retracts, it pulls trailer bed 5 in a rearward motion so that subframe I beams 45a and 45b move along rollers 35 and 41, respectively. Additionally, track rollers 55 and 57 are caused to move along tracks 71 and 72, respectively. Tracks 71 and 72 force track rollers 55 and 57 in an upward motion which causes trailer bed 5 to tilt. As a result, trailer bed 5 pivots around axis 28 of roller shaft 27. Trailer bed 5 is caused to gradually tilt until it reaches its full inclined position because top rails 73 and 74 and bottom rails 75 and 76, respectively, are parallel for most their length and the distance between top rails 73 and 74 and bottom rails 75 and 76, respectively, is only slightly larger than the diameter of track rollers 55 and 57. In other words, trailer bed 5 will not drop into the full inclined position as soon as more than half the combined weight of trailer bed 5 and load is shifted to a position that is behind rollers 35 and 41.

Because hydraulic cylinder 7 has one end anchored to front rail 61 and the other end anchored to cradle 21, it is also caused to pivot around axis 28 of roller shaft 27. Therefore, hydraulic cylinder 7 and trailer bed 5 pivot around the same point and always remain parallel to one another.

If the elevation of the ground behind the tilt-bed trailer is the same as the ground under the tires, trailing edge 84 of fold-down approach ramp 85 and the tires will be resting on the same plane. As a result, track rollers 55 and 57 will be resting on the horizontal portions 81 and 82 of bottom rails 75 and 76, respectively. If the elevation of the ground behind the tilt-bed trailer is lower than the elevation of the ground under the tires, trailing edge 84 of fold-down approach ramp 85 will be resting at a point that is lower than that of the tires. As a result, trailer bed 5 will have a slightly larger incline and track rollers 55 and 57 will move upwards and be resting against top rails 73 and 74, respectively. Thus, the increased gap between top rails 73 and 74 and bottom rails 75 and 76, respectively, allows the incline of trailer bed 5 to adjust to uneven terrain.

In the full inclined position, the height of unloaded deck 12 at a point directly above rollers 35 and 41 is approximately 36.25 inches and the length of that portion of deck 12 that is behind rollers 35 and 41, i.e., in back of, or on the right side of, the pivot axis 28 when viewing FIG. 3, is approximately 252 inches. Once trailer bed 5 is moved into the inclined position, the load can be driven, pushed, or pulled onto trailer bed 5. After trailer bed 5 is loaded, it is moved forward from an inclined loading position into the horizontal load-carrying position. This forward movement is caused by activating hydraulic cylinder 7 so that piston 11 is caused to extend from cylinder 9. As a result, trailer bed 5 is pushed in a forward direction and caused to tilt into a horizontal position. Once trailer bed 5 is moved into the forward horizontal load-carrying position, fold-down approach ramp 85 is caused to rotate so that is moves from the horizontal position to the vertical position. In this vertical position, fold-down approach ramp 85 will prevent an automobile from driving underneath trailer bed 5.

While the invention has been described in conjunction with a specific embodiment thereof, it is evident that different alternatives, modifications, and variations will be apparent to those skilled in the art in view of the foregoing description. Accordingly, the invention is not limited to these embodiments or the use of elements having specific configurations and shapes as presented herein.

We claim:

1. An apparatus operable to receive a load from a ground surface and to roll across the ground surface with the load on board, comprising:

a frame having a front end and a rear end;

a track mounted on the frame, the track having a front portion which occupies a first elevation and a rear portion which occupies a second elevation, wherein the second elevation is higher above the ground surface than the first elevation;

a support roller rotatably mounted on the frame and defining an axis of rotation proximate the rear end thereof;

a deck movably mounted on the frame and tiltable about the axis of the support roller, the deck having a front end and a rear end;

a track roller rotatably mounted on the deck proximate the front end thereof and disposed within the track on the frame;

a hydraulic cylinder having a first end operably connected to the deck and a second end operably connected to the frame, the hydraulic cylinder being tiltable about the axis of the support roller together with the deck, and the hydraulic cylinder being operable to move and tilt the deck between a load transporting position, wherein the deck is relatively forward on the frame and substantially horizontal relative to the ground surface, and a load receiving position, wherein the deck is relatively rearward on the frame and occupies an angle of less than ten degrees relative to the ground surface, and the rear end thereof is proximate the ground surface.

2. The apparatus of claim 1, wherein the front end of the frame is adapted to mate with a trailer hitch.

\* \* \* \* \*